(12) United States Patent
Awasa

(10) Patent No.: US 9,611,001 B2
(45) Date of Patent: Apr. 4, 2017

(54) SUSPENSION

(71) Applicant: Showa Corporation, Gyoda-shi (JP)

(72) Inventor: Shigeki Awasa, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/866,071

(22) Filed: Sep. 25, 2015

(65) Prior Publication Data

US 2016/0090147 A1   Mar. 31, 2016

(30) Foreign Application Priority Data

Sep. 30, 2014  (JP) ................................ 2014-202119

(51) Int. Cl.
*F16F 9/04* (2006.01)
*B62K 25/28* (2006.01)
*B60G 15/12* (2006.01)
*F16F 9/05* (2006.01)

(52) U.S. Cl.
CPC ............ *B62K 25/283* (2013.01); *B60G 15/12* (2013.01); *F16F 9/057* (2013.01); *B60G 2202/32* (2013.01); *B60G 2300/12* (2013.01)

(58) Field of Classification Search
CPC ......... F16F 9/003; B60G 15/08; B60G 15/10; B60G 15/12; B60G 2202/327; B60B 19/00; B60C 17/01933; B60C 17/044; B60C 17/0485; B60C 17/06
USPC ...... 267/64.19–64.27, 122, 220; 188/321.11, 188/322.17, 322.18, 322.19, 322.22
See application file for complete search history.

(56) References Cited

U.S. PATENT DOCUMENTS

| | | | | |
|---|---|---|---|---|
| 3,391,922 A | * | 7/1968 | Axthammer | B60G 17/044 267/64.17 |
| 3,700,225 A | * | 10/1972 | Fader | F16F 9/084 267/35 |
| 4,802,657 A | * | 2/1989 | Wijnhoven | B60G 17/01933 188/1.11 E |
| 5,669,597 A | * | 9/1997 | Rittstieg | B60G 17/044 267/64.17 |
| 6,237,902 B1 | | 5/2001 | Lindstrom | |

(Continued)

FOREIGN PATENT DOCUMENTS

| | | |
|---|---|---|
| DE | 102011084665 A | 4/2013 |
| DE | 102012003302 A | 8/2013 |
| JP | 2007-203858 A | 8/2007 |

OTHER PUBLICATIONS

Extended European Search Report mailed Mar. 10, 2016 for the corresponding European Patent Application No. 15187041.7.

*Primary Examiner* — Christopher Schwartz
(74) *Attorney, Agent, or Firm* — Leason Ellis LLP

(57) ABSTRACT

An reaction force adjustment member is attached to a suspension including a cylinder, a piston rod which has a piston at one end thereof and which is inserted into the cylinder together with the piston, and a diaphragm which has one end fixed to the cylinder and the other end fixed to the other end of the piston rod and which forms an air chamber around at least the piston rod. The reaction force adjustment member includes a cylindrical member which is provided on an outer circumference of the cylinder surrounded by the diaphragm when the suspension is extended and compressed. An outer circumference surface of the cylindrical member has an uneven surface.

16 Claims, 13 Drawing Sheets

(56) References Cited

U.S. PATENT DOCUMENTS

| | | | |
|---|---|---|---|
| 6,332,624 B1 * | 12/2001 | Gilsdorf | B60G 17/0485 267/64.21 |
| 6,454,248 B2 * | 9/2002 | Pradel | B60G 17/044 267/64.11 |
| 7,175,165 B1 * | 2/2007 | Vande Brake | F16F 9/057 267/64.21 |
| 7,226,045 B2 * | 6/2007 | Brookes | B60G 13/003 188/321.11 |
| 2005/0236748 A1 | 10/2005 | Gross et al. | |
| 2007/0175691 A1 | 8/2007 | Gogo et al. | |
| 2013/0147099 A1 | 6/2013 | Eike et al. | |
| 2014/0167385 A1 | 6/2014 | Gogo et al. | |

* cited by examiner

Related Art

*Related Art*

Related Art

SUSPENSION

CROSS-REFERENCE TO RELATED APPLICATIONS

This application is based on and claims priority under 35 USC 119 from Japanese Patent Application No. 2014-202119 filed on Sep. 30, 2014, the entire content of which is incorporated herein by reference.

BACKGROUND

1. Technical Field

Embodiments of the present invention relate to a reaction force adjustment member and a suspension.

2. Related Art

Motorcycles have a suspension in order to improve ride comfort or the like. FIG. 11 is a side view illustrating an appearance of a related-art suspension 200 provided on a rear wheel of one of the motorcycles.

As illustrated in FIG. 11, the suspension 200 for the rear wheel includes a damper body 210 that absorbs and damps vibration transmitted from a road surface during travelling and a metal coil spring 220 that alleviates transmission of vibration to a vehicle body. The suspension 200 is provided between the vehicle body and a swing arm attached to the wheel, for example. Thus, a portion of the damper body 210 is inserted into the metal coil spring 220, and the metal coil spring 220 is provided between the vehicle body and the swing arm.

FIG. 12 is a diagram illustrating reaction force characteristics of the metal coil spring 220 of the suspension 200. FIG. 12 illustrates the reaction force characteristics of three metal coil springs 220 having different elasticity. As illustrated in FIG. 12, the reaction force characteristics of the metal coil spring 220 changes approximately in proportion to a change in a stroke of the suspension 200.

In the suspension 200, when different reaction force characteristics of the metal coil spring 220 are desired, it is necessary to replace the metal coil spring 220 itself with another metal coil spring 220.

An air spring structure which includes a diaphragm around a piston rod to constitute an air chamber and which generates reaction force using a pressure of air in the air chamber is known as an example of a suspension structure.

When a coil spring structure is compared with the air spring structure, a load of the coil spring is heavier than constituent members of the air chamber, an inertial force and a bending load acting on the suspension in the coil spring structure are larger than those of the air spring structure. Thus, the coil spring structure has poor stroke operability than the air spring structure. Thus, in order to adjust the reaction force easily and improve the stroke operability, the air spring structure is more ideal than the coil spring structure.

FIG. 13 is a diagram illustrating an example of reaction force characteristics of a suspension having the air spring structure. As illustrated in FIG. 13, the reaction force characteristics of the suspension having the air spring structure change monotonously with the change in the stroke of the suspension.

SUMMARY OF INVENTION

As described above, although the suspension having the air spring structure has superior stroke operability than the coil spring structure, for example, the reaction force characteristics changes monotonously with the change in the stroke of the suspension similarly to the coil spring structure.

Although there is a demand to change the reaction force characteristics of the suspension arbitrarily with respect to the change in the stroke, the related-art suspension having the air spring structure does not meet this demand.

Illustrative aspects of the present invention are to provide a reaction force adjustment member capable of changing the reaction force characteristics of the suspension arbitrarily and the suspension having the reaction force adjustment member.

The reaction force adjustment member according to an embodiment is attached to the suspension including: a cylinder; a piston rod which has a piston at one end thereof and which is inserted into the cylinder together with the piston; and a diaphragm which has one end fixed to the cylinder and the other end fixed to the other end of the piston rod and which forms an air chamber around at least the piston rod.

The reaction force adjustment member includes a cylindrical member which is provided on an outer circumference of the cylinder surrounded by the diaphragm when the suspension is extended and compressed, in which an outer circumference of the cylindrical member has an uneven surface.

With the configuration, the reaction force adjustment member capable of changing the reaction force characteristics of the suspension arbitrarily and the suspension having the reaction force adjustment member can be provided.

DESCRIPTION OF EMBODIMENTS

Hereinafter, embodiments of the present invention will be described with reference to the drawings.

First Embodiment

Figure 1:
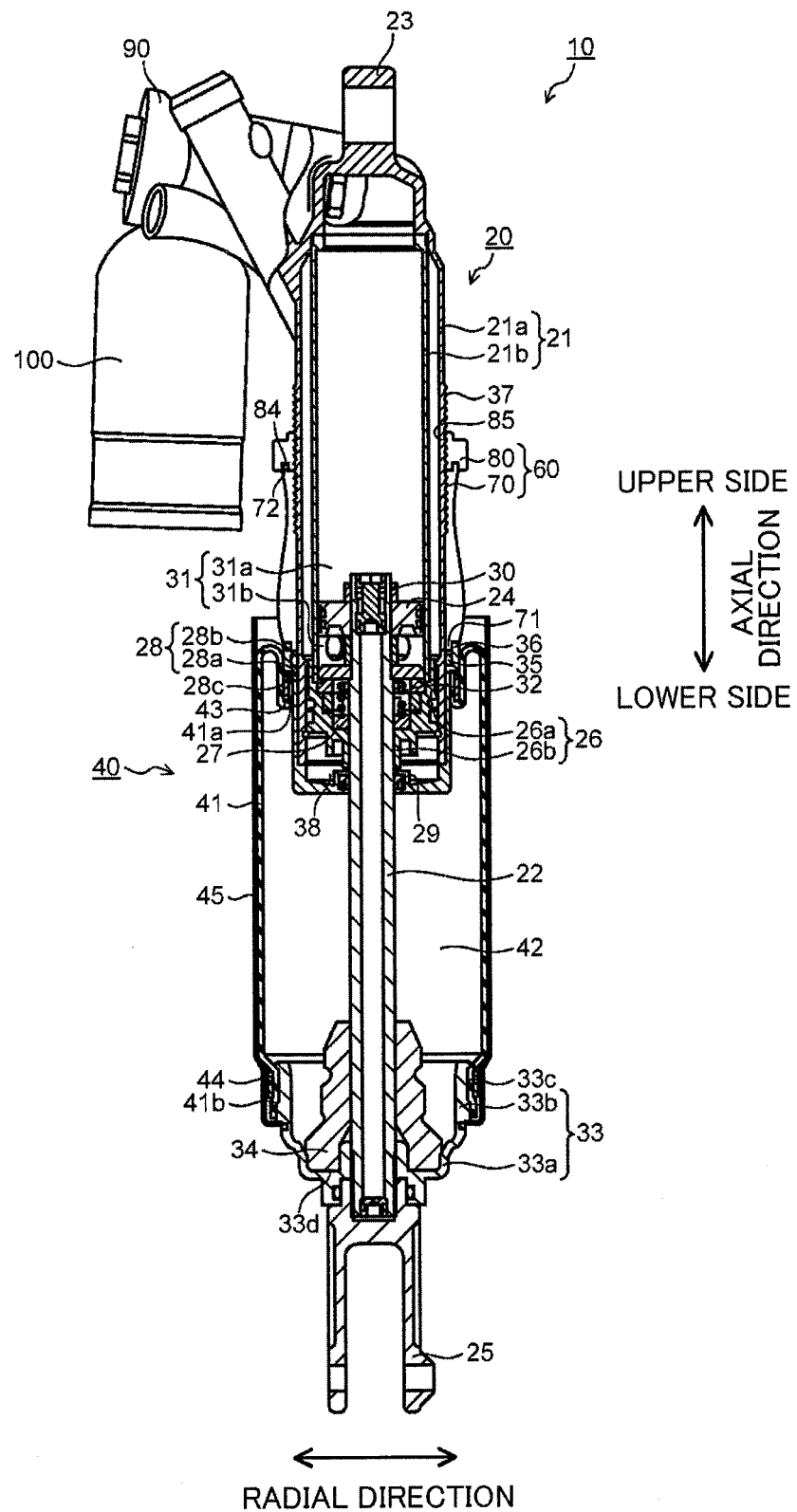
FIG. 1 is a longitudinal cross-sectional view of a suspension according to a first embodiment when extended to its maximum extent.

FIG. 1 is a longitudinal cross-sectional view of a suspension 10 according to a first embodiment. FIG. 1 illustrates a state in which the suspension 10 is extended to its maximum extent. As illustrated in FIG. 1, the suspension 10 includes a damper body 20, a diaphragm structure 40, and a reaction force adjustment member 60. The suspension 10 is a so-called air spring damper.

The damper body 20 includes a cylinder 21 and a piston rod 22 inserted in the cylinder 21 so as to freely slide. The cylinder 21 has, for example, a body-side attachment member 23 on an upper side (the upper side in an axial direction) and an opening on a lower side (the lower side in the axial direction). The axial direction means the direction of the central axes of the cylinder 21 and the piston rod 22 which are the same axes (the same herein below).

The piston rod 22 has a piston 24 on one end side and an axle-side attachment member 25 disposed on the other end side protruding outward from the cylinder 21. For example, when the body-side attachment member 23 is connected to a body side of a vehicle and the axle-side attachment member 25 is connected to an axle side of the vehicle, the suspension 10 is interposed between the body and a swing arm attached to a wheel. With relative movement (that is, telescopic movement) in the axial direction of the cylinder 21 and the piston rod 22, the damper body 20 exerts damping force to suppress the body vibration.

The cylinder 21 has a dual-cylinder structure that includes an outer cylinder 21a and an inner cylinder 21b, for example. The outer cylinder 21a has a closed upper end and is molded integrally with the body-side attachment member 23, for example. A lower end of the outer cylinder 21a is open. A rod guide 26 through which the piston rod 22 passes is fixed to the open lower end. The rod guide 26 is liquid-tightly fixed to an inner circumference at the lower end of the outer cylinder 21a, for example. A lower end of the inner cylinder 21b is in contact with a step portion of an end of an inner circumference at an upper end of the rod guide 26, and an upper end of the inner cylinder 21b is in contact with an inner surface at the upper end of the outer cylinder 21a, for example.

The rod guide 26 has a large-diameter cylinder portion 26a on the upper side and a small-diameter cylinder portion 26b on the lower side, for example. A central axis of the large-diameter cylinder portion 26a and a central axis of the small-diameter cylinder portion 26b are on the same axis. Moreover, an oil seal 27 is provided in the inner circumferential portion of the small-diameter cylinder portion 26b of the rod guide 26 so that the piston rod 22 can freely slide in a liquid-tight manner.

A bottomed cylindrical end member 28 having an open end and a bottom at the other end is provided on an outer circumference at the lower side of the outer cylinder 21a. The end member 28 has a larger outer diameter on the open end (the upper side in the axial direction) than the bottom. That is, the end member 28 has a small-diameter cylinder portion 28a and a large-diameter cylinder portion 28b which have the same inner diameter. Thus, a step portion 28c is formed at a boundary between the small-diameter cylinder portion 28a and the large-diameter cylinder portion 28b on an outer side in a radial direction. The central axis of the small-diameter cylinder portion 28a and the central axis of the large-diameter cylinder portion 28b are on the same axis.

The end member 28 is air-tightly fixed to an outer circumference of the outer cylinder 21a by an air seal 35 provided in an inner circumferential portion of the large-diameter cylinder portion 28b. An opening through which the piston rod 22 passes is formed in a bottom of the small-diameter cylinder portion 28a. An air seal 29 is provided in an inner circumferential portion of this opening so that the piston rod 22 can freely slide in an air-tight manner. A lower end of the outer cylinder 21a is in contact with the inner surface of the lower end of the end member 28, for example. Here, in the end member 28, a space 38 is formed between the end member 28 and the rod guide 26.

An oil chamber 31 of the cylinder 21 is divided into a piston-side oil chamber 31a and a rod-side oil chamber 31b by the piston 24 which is fixed to one end side of the piston rod 22 by a nut 30 and is inserted into the inner cylinder 21b so as to freely slide on an inner circumference thereof. The rod guide 26 and the end member 28 are included in the damper body 20.

The damper body 20 includes a rebound spring 32 that is provided around the piston rod 22 and between the piston 24 and the rod guide 26 so as to restrict extension-side stroke.

The damper body 20 includes a rod-side member 33 of a bottomed cylinder. The rod-side member 33 has a small-diameter cylinder portion 33a on the lower side and a large-diameter cylinder portion 33b on the upper side. An opening through which the other end of the piston rod 22 passes and which supports the piston rod 22 is formed in a bottom of the small-diameter cylinder portion 33a. A central axis of the small-diameter cylinder portion 33a and a central axis of the large-diameter cylinder portion 33b are on the same axis.

The other end of the piston rod 22 is fixed to the axle-side attachment member 25 with an opening of the small-diameter cylinder portion 33a of the rod-side member 33 interposed. A pressure adjustment portion (not illustrated) that adjusts internal pressure of the air chamber 42 that comprises a diaphragm structure 40 described later is provided in the rod-side member 33. Air, nitrogen, and the like is filled into the air chamber 42 from an air supply source outside the suspension 10, for example, via the pressure adjustment portion.

Moreover, the damper body 20 includes a cylindrical bumper rubber 34 that is disposed in the rod-side member 33 and around the piston rod 22 so as to restrict compression-side stroke. A lower end of the bumper rubber 34 is fitted into a circular recess 33d formed in the small-diameter cylinder portion 33a of the rod-side member 33. The bumper rubber 34 is formed from urethane, foamed urethane, or rubber, for example.

In order to prevent contact between the end member 28 and the rod-side member 33, for example, during a compression stroke, an outer diameter of the small-diameter cylinder portion 28a of the end member 28 is smaller than an inner diameter of the large-diameter cylinder portion 33b of the rod-side member 33.

Here, a damping force generating device 90 and a reservoir 100 that communicates with the damping force generating device 90 are provided in series on an upper portion of the outer cylinder 21a in which the body-side attachment member 23 is formed. The damping force generating device 90 communicates with the piston-side oil chamber 31*a* and the rod-side oil chamber 31*b* in the cylinder 21. Thus, the reservoir 100 communicates with the piston-side oil chamber 31*a* and the rod-side oil chamber 31*b* via the damping force generating device 90. The damping force generating device 90 adjusts compression-side damping force and extension-side damping force. The reservoir 100 compensates for volume of the piston rod 22 that advances into and retracts from the oil chamber 31 of the cylinder 21 (including volume corresponding to thermal expansion of oil).

The diaphragm 41 that constitutes the diaphragm structure 40 is formed of a cylindrical elastic member. Rubber or the like is used as the elastic member. One end 41*a* of the diaphragm 41 is fixed to an outer circumference surface of the small-diameter cylinder portion 28*a* close to the large-diameter cylinder portion 28*b* of the end member 28. That is, one end 41*a* of the diaphragm 41 is fixed to an outer circumference surface of the small-diameter cylinder portion 28*a* close to the step portion 28*c*. Due to this, movement of this fixing portion toward the body-side attachment member 23 (the upper side in the axial direction) is prevented.

The other end 41*b* of the diaphragm 41 is fixed to an outer circumference surface of the large-diameter cylinder portion 33*b* of the rod-side member 33. A groove 33*c* is formed in a circumferential direction, for example, in the outer circumference surface of the large-diameter cylinder portion 33*b* that fixes the other end 41*b* of the diaphragm 41. A width of the groove 33*c* is set so as to correspond to a width of a fastening band 44 described later. Due to the groove 33*c*, it is possible to align the fixing portion easily and to prevent movement of the fixing portion in an up and down direction (the axial direction).

Here, in the diaphragm structure 40, an attachment diameter of the large-diameter cylinder portion 33*b* of the rod-side member 33 to which the other end 41*b* of the diaphragm 41 is fixed is set to be larger than an attachment diameter of the small-diameter cylinder portion 28*a* of the end member 28 to which one end 41*a* of the diaphragm 41 is fixed. By utilizing a difference in the attachment diameters, an annular space is formed around the upper side (the upper side in the axial direction) of the end member 28 having the small attachment diameter. This annular space has such a shape in a cross-sectional view that is formed when an inverted U-shaped space is rotated about the central axis of the cylinder 21 and the piston rod 22.

The diaphragm 41 has metallic fastening bands 43 and 44 which are wound and fastened from an outer circumference side and are thereby fixed to the end member 28 and the rod-side member 33, respectively, for example. The fastening bands 43 and 44 may have a C-shaped ring form or a circular ring form.

Being provided with the diaphragm 41 in such a manner, the air chamber 42 is formed around the cylinder 21 (the end member 28) and the piston rod 22. The air chamber 42 is filled with air, nitrogen, or the like and is hermetically sealed. The diaphragm 41 rolls on an outer circumference of the large-diameter cylinder portion 28*b* of the end member 28 and a cylindrical member 70 of the reaction force adjustment member 60 described later with extension and compression of the damper body 20. Here, the air chamber 42 filled with air having predetermined pressure forms an air spring that pushes the damper body 20 in the extension direction. Thus, spring force is generated according to a change in volume of the air chamber 42 with extension and compression of the damper body 20.

As illustrated in FIG. 1, the diaphragm structure 40 may include a cylindrical cover 45 that covers an outer circumference of the diaphragm 41. One end of the cover 45 is fixed to the large-diameter cylinder portion 33*b* of the rod-side member 33, for example. The other end of the cover 45 is open and extends over an end on the upper side of the diaphragm 41 in a state in which the suspension 10 is extended to its maximum extent illustrated in FIG. 1. The cover 45 is formed from a metal material, a resin material, or the like, for example. By covering the outer circumference of the diaphragm 41 with the cover 45, damage, abrasion, and the like of the diaphragm 41 due to dust, gravel, and the like can be prevented.

Next, the reaction force adjustment member 60 according to the first embodiment will be described.

Figure 2:
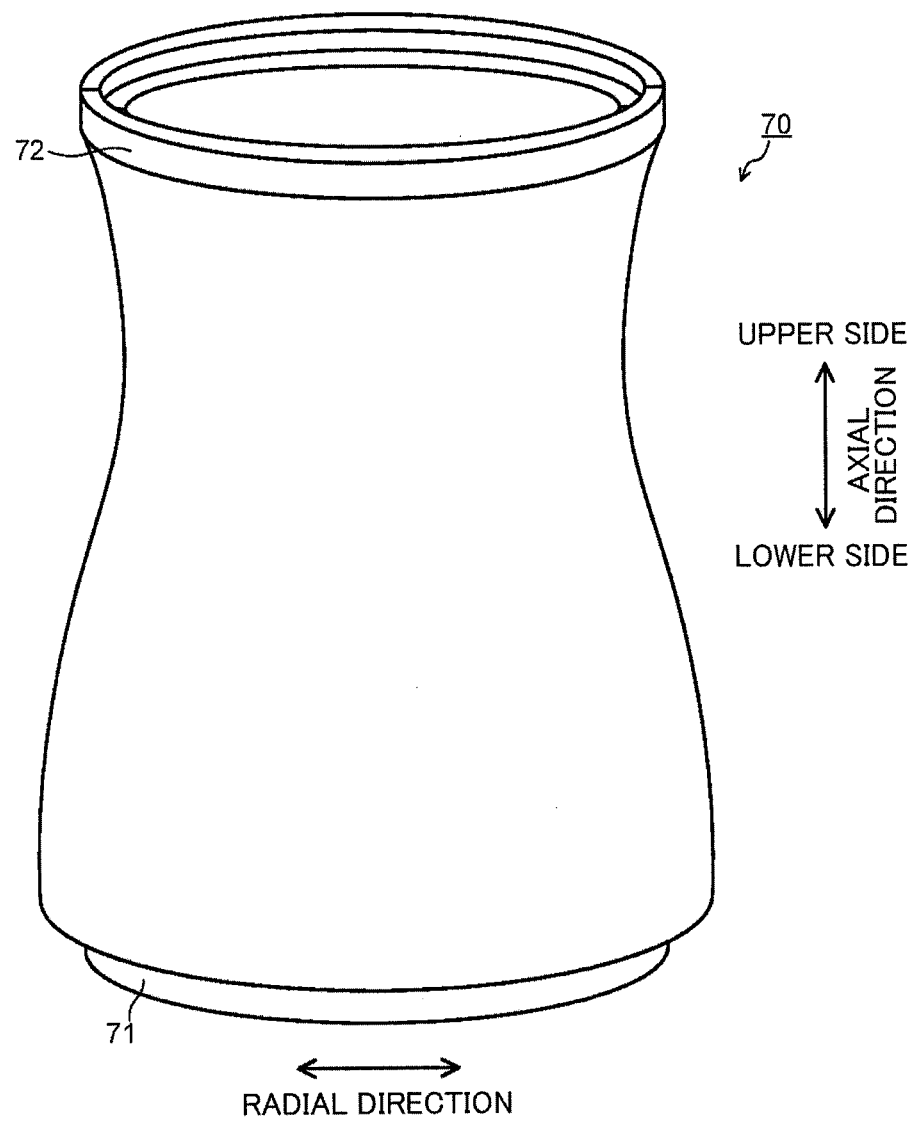
FIG. 2 is a perspective view of a reaction force adjustment member according to the first embodiment.
Figure 3:
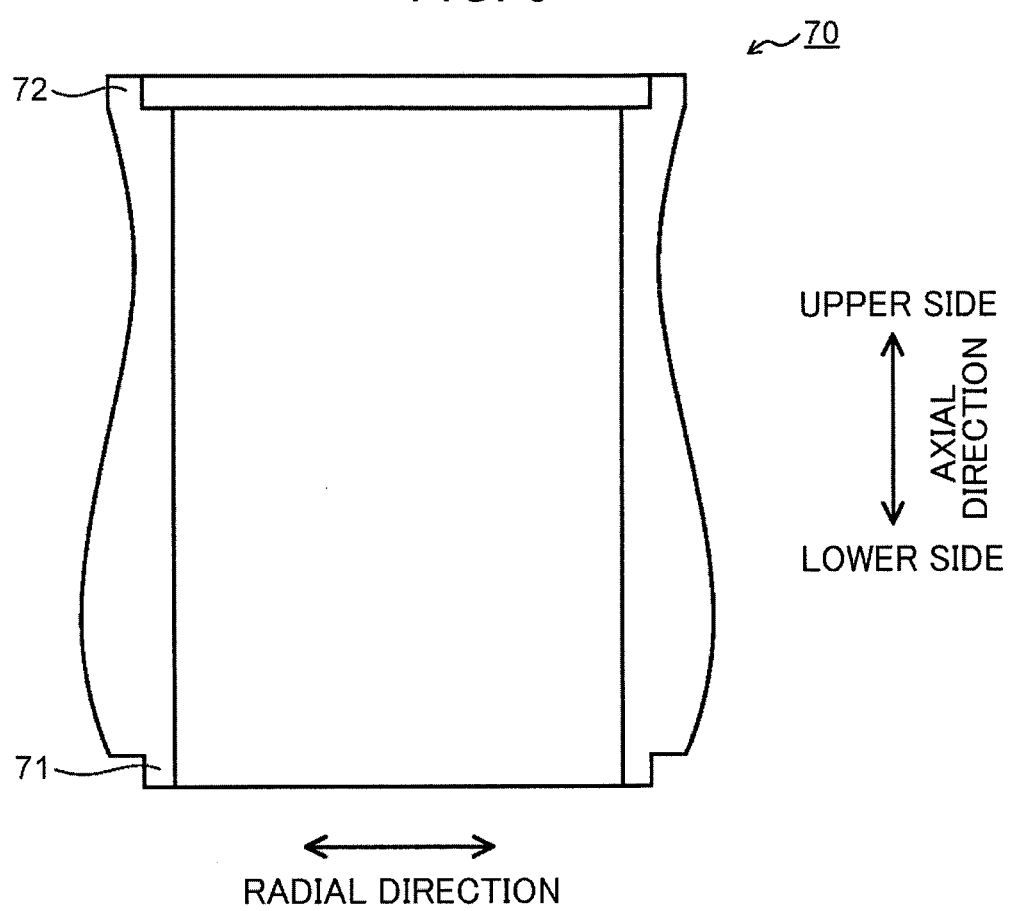
FIG. 3 is a side view of a divided cylindrical member of the reaction force adjustment member according to the first embodiment.
Figure 4:
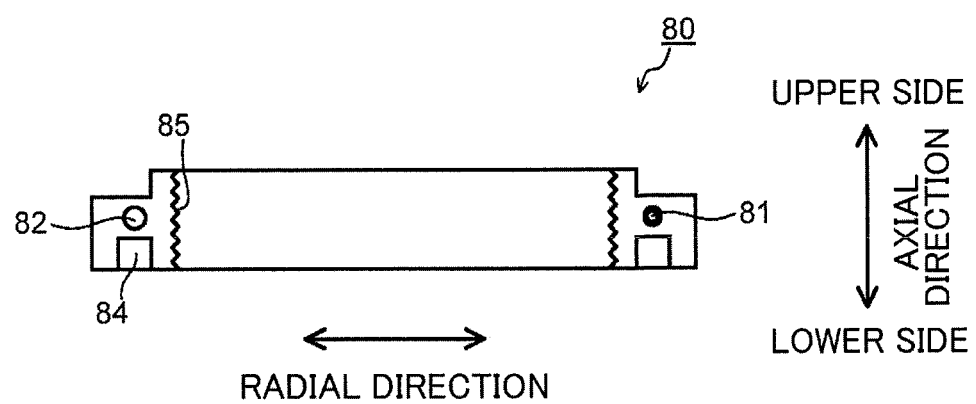
FIG. 4 is a side view of a divided fixing member of the reaction force adjustment member according to the first embodiment.

FIG. 2 is a perspective view of the reaction force adjustment member 60 according to the first embodiment. FIG. 3 is a side view of a divided cylindrical member 70 of the reaction force adjustment member 60 according to the first embodiment. FIG. 4 is a side view of a divided fixing member 80 of the reaction force adjustment member 60 according to the first embodiment. FIG. 3 illustrates a state when the cylindrical member 70 is seen from a dividing surface side and FIG. 4 illustrates a state when the fixing member 80 is seen from a dividing surface side.

As illustrated in FIGS. 1 to 3, the reaction force adjustment member 60 includes the cylindrical member 70 and the fixing member 80.

The cylindrical member 70 is divided into a plurality of members in the circumferential direction. The divided members are combined together in the circumferential direction to form a cylindrical shape. In this example, the cylindrical member 70 is divided into two members in the circumferential direction. The number of divided members is set appropriately as long as the number is two or more.

An outer circumference surface of the cylindrical member 70 has an uneven surface. This uneven surface comprises a curved surface, for example, and changes in the axial direction. The uneven surface has the same shape in the circumferential direction in a cross-section taken along the same axial direction, for example. That is, for example, in the cross-section taken along the same axial direction, an outward protrusion width (protrusion height) in the radial direction of the outer circumference surface of the cylindrical member 70 is the same. FIGS. 2 and 3 illustrate an uneven surface formed of a continuous curved surface including a curved surface having a convex portion on the outer side in the radial direction and a curved surface having a convex portion on the inner side in the radial direction, which are disposed in that order as it advances toward the upper side in the axial direction.

A shape of the uneven surface of the outer circumference surface of the cylindrical member 70 is an example and is not limited to the shape illustrated in FIGS. 2 and 3. The uneven surface shape can be set arbitrarily according to the demand of reaction force characteristics.

An inner circumference surface of the cylindrical member 70 is disposed in contact with the outer circumference surface of the outer cylinder 21*a*. Thus, an inner diameter of the cylindrical member 70 is set so as to correspond to an outer diameter of the outer cylinder 21*a*. An annular projection portion 71 that protrudes downward, for example, is formed on a lower end (the end close to the end member 28) of the cylindrical member 70. The projection portion 71 is fitted into an annular fitting groove 36 formed in an upper end (the end close to the body-side attachment member 23)

of the large-diameter cylinder portion 28b of the end member 28. With this fitting, a lower end side of the cylindrical member 70 is supported.

On the other hand, an annular projection portion 72 that protrudes upward, for example, is formed in an upper end (the end close to the body-side attachment member 23) of the cylindrical member 70. The projection portion 72 is fitted into a fitting groove 84 of the fixing member 80 described later. With this fitting, the upper end of the cylindrical member 70 is supported and the cylindrical member 70 is fixed.

Here, although not illustrated in the cylindrical member 70 of FIG. 3, in order to prevent contact between a threaded portion 37 formed on the outer cylinder 21a of the cylinder 21 described later and an inner circumference of the cylindrical member 70, a circular step portion that is depressed toward the outer side in the radial direction is formed over a predetermined length in the axial direction in a portion of an inner wall of the cylindrical member 70.

A material for forming the cylindrical member 70 is not particularly limited, but a resin material such as polybutylene terephthalate (PBT), a metal material such as aluminum, and the like, for example, can be used as the material for forming the cylindrical member 70. Further, ceramics or the like can be also used as the material for forming the cylindrical member 70. Among these materials, the cylindrical member 70 is preferably formed from a material having low thermal conductivity. In this case, the resin material or the like having low thermal conductivity is ideal.

Here, a change in temperature of the air in the air chamber 42 affects the reaction force characteristics. Thus, when the cylindrical member 70 is formed of the resin material, heat from the oil in the cylinder 21 is hardly transmitted to the air in the air chamber 42. Thus, it is possible to suppress the change in the temperature of the air in the air chamber 42 due to the temperature of the oil in the cylinder 21. This is particularly effective when the suspension 10 is compressed in its maximum extent, which will be described later.

The fixing member 80 is divided into a plurality of members in the circumferential direction, for example. The divided members are combined together in the circumferential direction to form an annular shape. In this example, the fixing member 80 is divided into two members in the circumferential direction. The fixing member 80 may be divided into three or more members. With such a divided structure, the fixing member 80 can be detachably attached to the outer circumference of the outer cylinder 21a of the cylinder 21.

As illustrated in FIG. 4, a screw hole 81 and a screw passage hole 82 are formed in each of the two divided members. A screw groove is formed in an inner circumferential portion of the screw hole 81. Then, as illustrated in FIG. 2, a screw 83 inserted from the screw passage hole 82 of the other member that pairs with the screw hole 81 is screwed into the screw hole 81. In this way, the two divided members are fixed to form an annular shape.

As illustrated in FIG. 4, the fitting groove 84 to which the projection portion 72 of the cylindrical member 70 is fitted is formed in the lower end (the end close to the end member 28) of the fixing member 80. A threaded portion 85 that engages with the threaded portion 37 formed on an outer circumference surface of the outer cylinder 21a of the cylinder 21 to allow the fixing member 80 to move in the up and down direction (axial direction) is formed on an inner circumferential portion of the fixing member 80.

The two divided members of the fixing member 80 are assembled on an upper side (the upper side in the axial direction) than the threaded portion 37 of the outer cylinder 21a, for example. The fixing member 80 that become the annular shape is moved downward while screwing the threaded portion 85 of the annular fixing member 80 onto the threaded portion 37 of the outer cylinder 21a. The fixing member 80 moves downward until the projection portion 72 of the cylindrical member 70 is completely fitted into the fitting groove 84 of the fixing member 80. In this manner, the upper end side of the cylindrical member 70 is supported and the cylindrical member 70 is fixed to the outer circumference of the outer cylinder 21a of the cylinder 21.

By an operation opposite to the above operation, the cylindrical member 70 can be detached from the outer circumference of the outer cylinder 21a. In this manner, the cylindrical member 70 is disposed so as to be detachable from the outer circumference of the outer cylinder 21a.

Here, the fixing member 80 may not affect the temperature of the air in the air chamber 42 due to its structure and arrangement unlike the cylindrical member 70. A material for forming the fixing member 80 is not particularly limited, but a resin material such as polybutylene terephthalate (PBT), a metal material such as aluminum, and the like, for example, can be used as the material for forming the fixing member 80.

As described above, the cylindrical member 70 fixed to the outer circumference of the outer cylinder 21a is disposed on the outer circumference of the outer cylinder 21a of the cylinder 21 surrounded by the diaphragm 41 when the suspension 10 (the damper body 20) is extended and compressed. That is, when the damper body 20 is extended and compressed, the cylindrical member 70 is present between the outer cylinder 21a and the diaphragm 41.

Thus, when the damper body 20 is extended and compressed, the diaphragm 41 rolls along the uneven surface of the outer circumference surface of the cylindrical member 70. Due to this, the volume of the air chamber 42 changes with the extension and compression of the damper body 20, and also the volume of the air chamber 42 changes with the rolling of the diaphragm 41 along the uneven surface of the outer circumference surface of the cylindrical member 70. With these changes in the volume, it is possible to change the reaction force. In other words, when the pressure of the air in the air chamber 42 is set to the predetermined pressure, by changing the shape of the uneven surface of the outer circumference surface of the cylindrical member 70, it is possible to obtain different reaction force characteristics.

In this example, although an example in which the fixing member 80 is divided into a plurality of members in the circumferential direction has been illustrated, the present invention is not limited to this configuration. The fixing member 80 may originally be formed of an annular member, for example. In this case, the fixing member 80 is attached around the outer cylinder 21a from the lower side (the lower side in the axial direction) of the outer cylinder 21a of the cylinder 21 before the end member 28 is disposed. Then, the fixing member 80 is moved in advance up to an upper position at which the projection portion 72 of the cylindrical member 70 can be fitted while screwing the threaded portion 85 of the fixing member 80 onto the threaded portion 37 of the outer cylinder 21a from the lower side. Subsequently, the cylindrical member 70 is fixed according to the method as described above.

Next, operation of the suspension 10 according to the first embodiment will be described.

Figure 5:
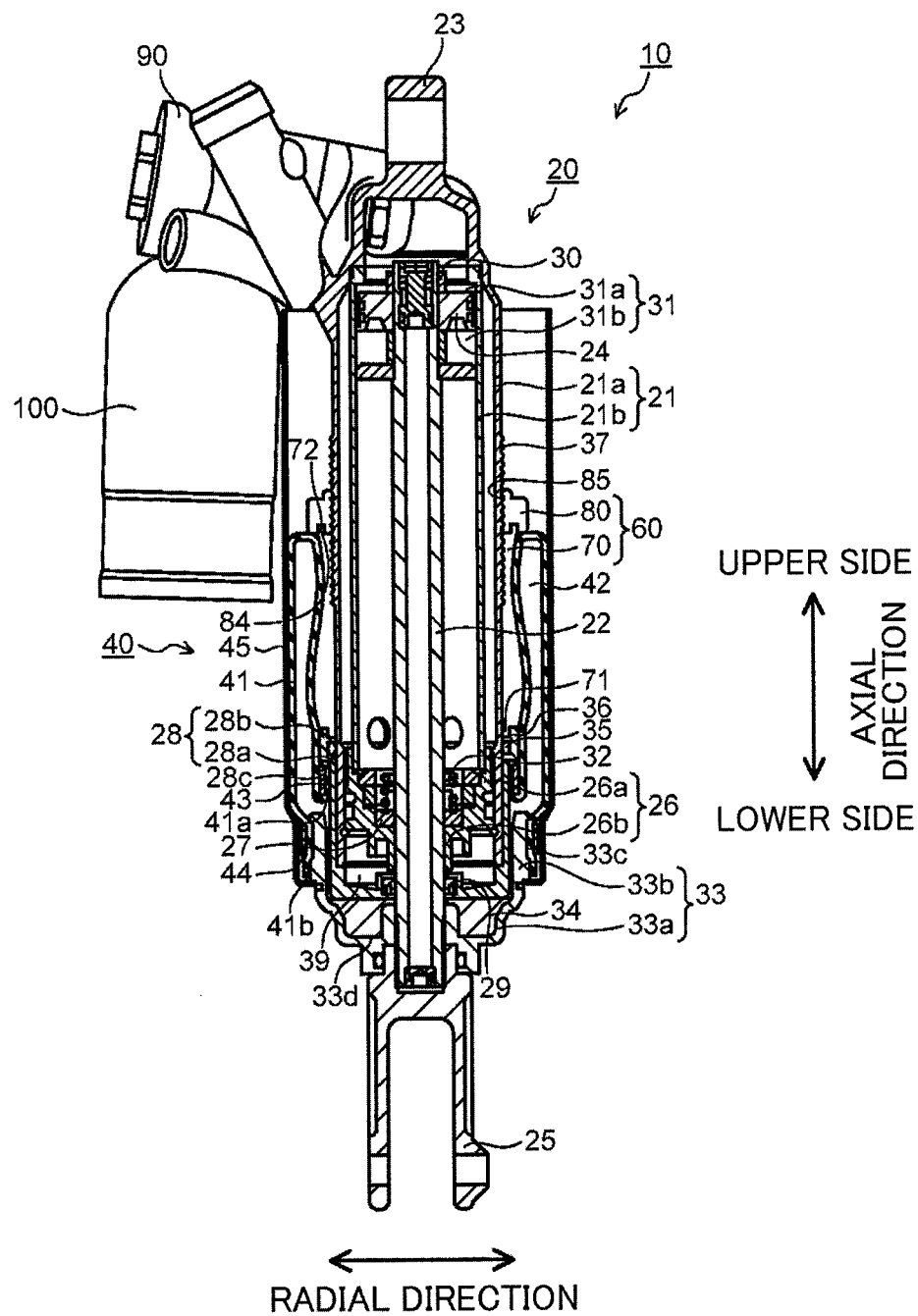
FIG. 5 is a longitudinal cross-sectional view of the suspension according to the first embodiment when compressed to its maximum extent.

Here, operation of the diaphragm structure 40 will be described mainly. FIG. 5 is a longitudinal cross-sectional view of the suspension 10 according to the first embodiment.

FIG. 5 illustrates a state in which the suspension 10 is compressed to its maximum extent.

In the compression stroke, when the suspension 10 (the damper body 20) starts being compressed from the maximum extension state of the suspension 10 illustrated in FIG. 1, the diaphragm 41 rolls upward along the uneven surface of the outer circumference surface of the cylindrical member 70. On this occasion, the volume of the air chamber 42 changes with the compression of the damper body 20, and, in addition to that, the volume of the air chamber 42 changes with the rolling of the diaphragm 41 along the uneven surface of the outer circumference surface of the cylindrical member 70. That is, since the outer circumference surface of the cylindrical member 70 has the uneven surface shape, the diaphragm 41 is deformed according to the uneven surface shape, and the volume of the air chamber 42 changes. With these changes in the volume, the reaction force changes.

In the state in which the suspension 10 is compressed to its maximum extent, as illustrated in FIG. 5, the air chamber 42 forms an annular space between the cylindrical member 70, the end member 28, and the cover 45. On this occasion, since the cylindrical member 70 is formed of the material having low thermal conductivity such as the resin material, as described above, the heat from the oil in the cylinder 21 is hardly transmitted to the air in the air chamber 42 via the cylindrical member 70. Thus, the change in the temperature of the air in the air chamber 42 due to the temperature of the oil in the cylinder 21 is suppressed, and the change in the reaction force characteristics due to the change in the temperature of the air in the air chamber 42 can be suppressed.

On the other hand, when the suspension 10 starts being extended from the maximum compression state, the diaphragm 41 rolls downward along the uneven surface of the outer circumference surface of the cylindrical member 70. On this occasion, the volume of the air chamber 42 changes with the extension of the damper body 20, and, in addition to that, the volume of the air chamber 42 changes with the rolling of the diaphragm 41 along the uneven surface of the outer circumference surface of the cylindrical member 70. That is, since the outer circumference surface of the cylindrical member 70 has the uneven surface shape, the diaphragm 41 is deformed according to the uneven surface shape, and the volume of the air chamber 42 changes. With these changes in the volume, the reaction force changes. And then, the suspension 10 enters the maximum extension state (see FIG. 1).

Since the suspension 10 mounted on the vehicle repeats extension and compression irregularly, for example, the suspension 10 rarely changes continuously from the maximum extension state to the maximum compression state. However, the suspension 10 mounted on the vehicle is somewhere between the maximum extension state and the maximum compression state.

The reaction force adjustment member 60 according to the first embodiment includes the cylindrical member 70 and thus can change the reaction force characteristics of the suspension 10 arbitrarily by changing size and shape of the cylindrical member 70 arbitrarily. In particular, by changing the uneven surface shape of the outer circumference surface of the cylindrical member 70, it is possible to set the reaction force characteristics arbitrarily according to the stroke of the suspension 10 and to adjust the reaction force characteristics easily.

Moreover, since the reaction force adjustment member 60 includes the cylindrical member 70 that is detachably attached thereto, the reaction force adjustment member 60 can be replaced in the suspension 10 having the diaphragm 41. Further, since the reaction force adjustment member 60 includes the cylindrical member 70 that is detachably attached as a divided structure, the reaction force adjustment member 60 can be replaced more easily in the suspension 10 having the diaphragm 41. When the cylindrical member 70 has the divided structure, the reaction force adjustment member 60 according to the first embodiment can be applied to an existing suspension having the diaphragm 41 even when the suspension is attached to a vehicle body, for example.

According to the suspension 10 having the reaction force adjustment member 60 of the first embodiment, it is possible to change the volume of the air chamber 42 with extension and compression of the damper body 20 and to change the volume of the air chamber 42 with rolling of the diaphragm 41 along the uneven surface of the outer circumference surface of the cylindrical member 70. That is, the reaction force characteristics can be adjusted further more arbitrarily according to a combination of the pressure of the air chamber 42 and the uneven surface shape of the outer circumference surface of the cylindrical member 70.

Second Embodiment

Figure 6:
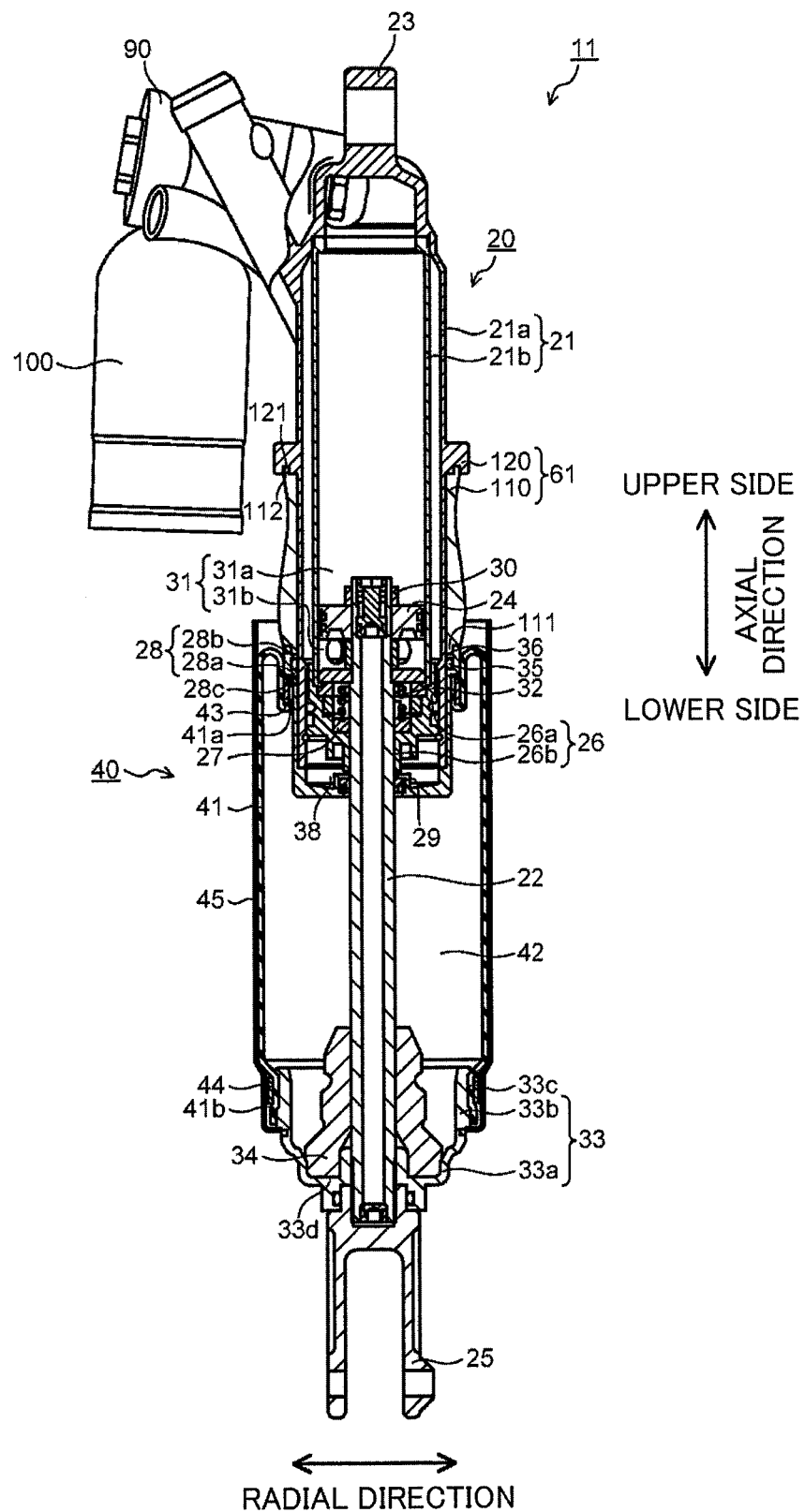
FIG. 6 is a longitudinal cross-sectional view of a suspension according to a second embodiment.

FIG. 6 is a longitudinal cross-sectional view of a suspension 11 according to a second embodiment. FIG. 6 illustrates a state in which the suspension 11 is extended to its maximum extent. The same constituent elements as those of the suspension 10 of the first embodiment will be denoted by the same reference numerals, and redundant description thereof will be omitted or simplified.

In the suspension 11 according to the second embodiment, the reaction force adjustment member and the fixing member have different configurations from those of the suspension 10 according to the first embodiment. Thus, in this example, the configurations of the reaction force adjustment member and the fixing member will be described mainly.

As illustrated in FIG. 6, a reaction force adjustment member 61 includes a cylindrical member 110 and a fixing member 120.

The cylindrical member 110 has a cylindrical shape. The cylindrical member 110 is not divided into a plurality of members in the circumferential direction, for example. An outer circumference surface of the cylindrical member 110 has an uneven surface. The uneven surface shape is the same as the uneven surface shape of the cylindrical member 70 of the first embodiment, and description thereof will not be provided.

The cylindrical member 110 is disposed so that an inner circumference surface thereof is in contact with the outer circumference surface of the outer cylinder 21a. Thus, an inner diameter of the cylindrical member 110 is set so as to correspond to the outer diameter of the outer cylinder 21a. An annular projection portion 111 that protrudes downward, for example, is formed on a lower end of the cylindrical member 110. The projection portion 111 is fitted into the annular fitting groove 36 formed near the upper end of the large-diameter cylinder portion 28b of the end member 28. With this fitting, the lower end of the cylindrical member 110 is supported.

On the other hand, an annular projection portion 112 that protrudes upward, for example, is formed on an upper end of the cylindrical member 110. The projection portion 112 is fitted into a fitting groove 121 of the fixing member 120 described later. With this fitting, the upper end of the cylindrical member 110 is supported and the cylindrical member 110 is fixed.

A material for forming the cylindrical member 110 is the same as the material for forming the cylindrical member 70 of the first embodiment.

As illustrated in FIG. 6, the fixing member 120 is formed as a projection portion formed on the outer surface of the outer cylinder 21a of the cylinder 21 along the circumferential direction, for example. The fixing member 120 may be formed integrally with the outer cylinder 21a when forming the outer cylinder 21a, for example. Moreover, the fixing member 120 may be formed separately from the outer cylinder 21a by bonding a ring-shaped member to the outer surface of the outer cylinder 21a, for example. Further, the fixing member 120 is fixed at a predetermined axial position on the outer surface of the outer cylinder 21a so as to correspond to the axial length of the cylindrical member 110.

Since the fixing member 120 is fixed in this manner, the threaded portion of the first embodiment is not formed on the outer surface of the outer cylinder 21a.

As illustrated in FIG. 6, a fitting groove 121 to which the projection portion 112 of the cylindrical member 110 is fitted is formed on a lower end of the fixing member 120. A material for forming the fixing member 120 is the same as the material for forming the fixing member 80 of the first embodiment.

The reaction force adjustment member 61 is assembled in the following manner. As described above, the fixing member 120 is fixed at a predetermined axial position on the outer surface of the outer cylinder 21a. First, the cylindrical member 110 is attached around the outer cylinder 21a from the lower side (the lower side in the axial direction) of the outer cylinder 21a of the cylinder 21 before the end member 28 is disposed. The cylindrical member 110 is moved to the upper side in the axial direction and the projection portion 112 is fitted into the fitting groove 121 of the fixing member 120.

Subsequently, the end member 28 is fitted to the outer cylinder 21a from the lower side (the lower side in the axial direction) of the outer cylinder 21a of the cylinder 21. In this case, the projection portion 111 of the cylindrical member 110 is fitted into the fitting groove 36 of the end member 28.

Subsequently, the diaphragm 41 and the cover 45 are assembled in that order. The end member 28, the diaphragm 41, and the cover 45 may be assembled in advance to form a unit. In this case, after the cylindrical member 110 is assembled, the end member 28 which is a part of the unit is fitted to the outer cylinder 21a from the lower side (the lower side in the axial direction) of the outer cylinder 21a of the cylinder 21 to attach the unit.

As described above, the cylindrical member 110 fixed to the outer circumference of the outer cylinder 21a is disposed on the outer circumference of the outer cylinder 21a of the cylinder 21 surrounded by the diaphragm 41 when the suspension 10 (the damper body 20) is extended and compressed. That is, when the damper body 20 is extended and compressed, the cylindrical member 110 is present between the outer cylinder 21a and the diaphragm 41.

Thus, when the damper body 20 is extended and compressed, the diaphragm 41 rolls along the uneven surface of the outer circumference surface of the cylindrical member 110. Due to this, the volume of the air chamber 42 changes with extension and compression of the damper body 20 and the volume of the air chamber 42 changes with the rolling of the diaphragm 41 along the uneven surface of the outer circumference surface of the cylindrical member 110. With these changes in the volume, it is possible to change the reaction force. In other words, when the pressure of the air in the air chamber 42 is set to the predetermined pressure, by changing the shape of the uneven surface of the outer circumference surface of the cylindrical member 110, it is possible to obtain different reaction force characteristics.

Operation of the suspension 11 according to the second embodiment is the same as the operation of the suspension 10 according to the first embodiment, and description thereof will not be provided.

The reaction force adjustment member 61 according to the second embodiment includes the cylindrical member 110 and thus can change the reaction force characteristics of the suspension 11 arbitrarily by changing size and shape of the cylindrical member 110 arbitrarily. In particular, by changing the uneven surface shape of the outer circumference surface of the cylindrical member 110, it is possible to set the reaction force characteristics arbitrarily according to the stroke of the suspension 11 and to adjust the reaction force characteristics easily.

According to the suspension 11 having the reaction force adjustment member 61 of the second embodiment, it is possible to change the volume of the air chamber 42 with extension and compression of the damper body 20 and to change the volume of the air chamber 42 with rolling of the diaphragm 41 along the uneven surface of the outer circumference surface of the cylindrical member 110. That is, the reaction force characteristics can be adjusted further more arbitrarily according to a combination of the pressure of the air chamber 42 and the uneven surface shape of the outer circumference surface of the cylindrical member 110.

In this embodiment, although an example in which the cylindrical member 110 that is not divided into a plurality of members in the circumferential direction has been illustrated, the cylindrical member 110 may be divided into a plurality of members in the circumferential direction, for example. In this case, the same operational effect as the cylindrical member 110 can be obtained.

In this embodiment, although an example of the reaction force adjustment member 61 including the cylindrical member 110 and the fixing member 120 has been illustrated, the reaction force adjustment member 61 may include the cylindrical member 110 only, for example. In this case, even when the fixing member 120 described above is not provided, an upper portion of the cylindrical member 110 may be supported by a protruding portion that protrudes outward in the radial direction from the outer cylinder 21a of the cylinder 21 to suppress movement in the axial direction, for example.

Figure 7:
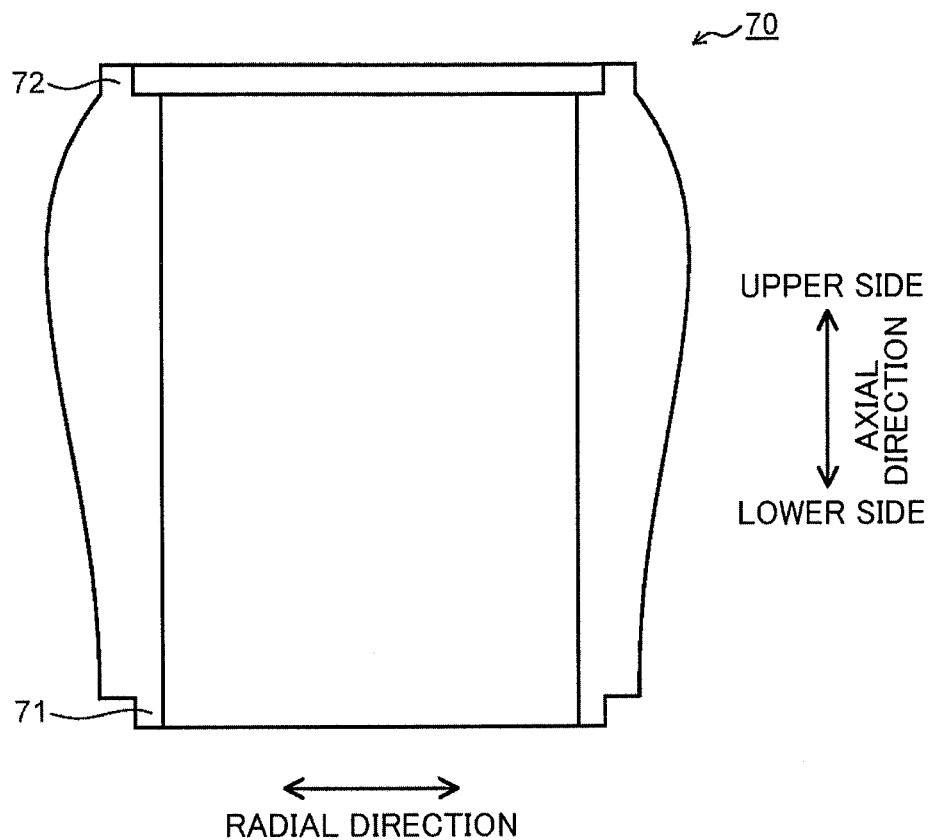
FIG. 7 is a side view of a divided cylindrical member having another configuration, of the reaction force adjustment member according to the first embodiment.

When this supporting structure and the cylindrical member 110 divided into a plurality of members in the circumferential direction are provided, the cylindrical member 110 can be attached to an existing suspension having the diaphragm 41 even when the suspension is attached to a vehicle body, for example, Evaluation of Reaction Force Characteristics The reaction force characteristics of the suspension 10 according to the first embodiment were evaluated when the state of the suspension 10 is changed continuously from the maximum extension state to the maximum compression state (that is, the stroke is changed from the maximum extension stroke to the maximum compression stroke). FIG. 7 is a side view of the divided cylindrical member 70 having another configuration of the reaction force adjustment member 60 according to the first embodiment. FIG. 7 illustrates the state when the cylindrical member 70 is seen from the dividing surface side.

In this example, although the reaction force characteristics are evaluated using the reaction force adjustment member 60 of the first embodiment, the same evaluation results are obtained even when the reaction force adjustment member 61 of the second embodiment is used.

Figure 8:
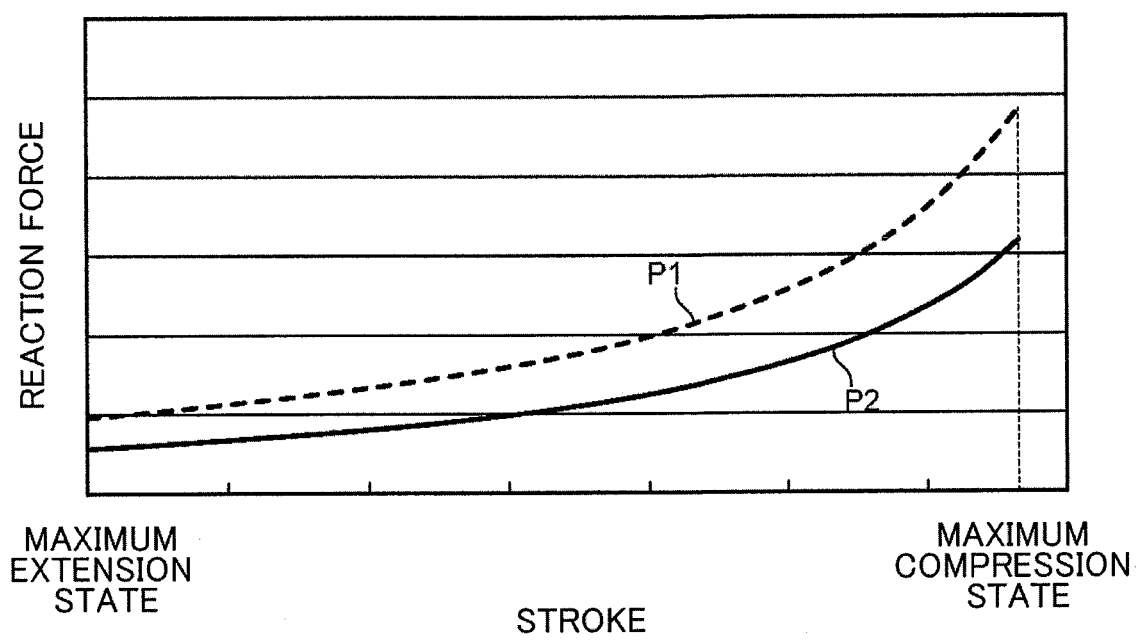
FIG. 8 is a diagram illustrating reaction force characteristics when the reaction force adjustment member is not provided and an air chamber has different pressure conditions.
Figure 9:
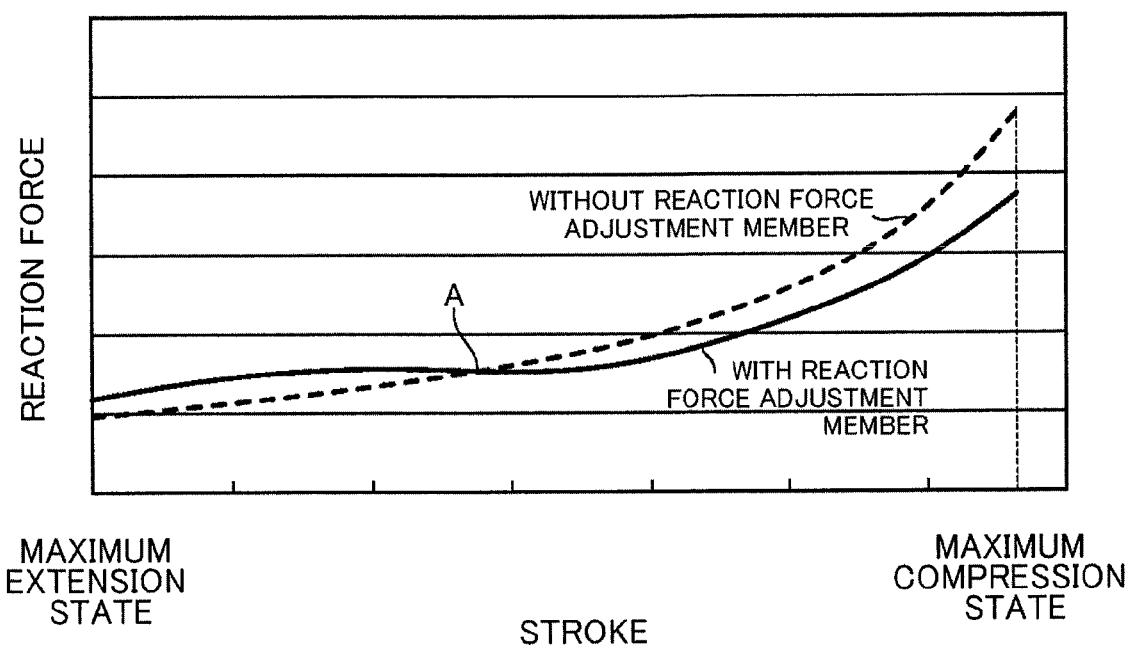
FIG. 9 is a diagram illustrating reaction force characteristics when the cylindrical member illustrated in FIG. 3 is provided.
Figure 10:
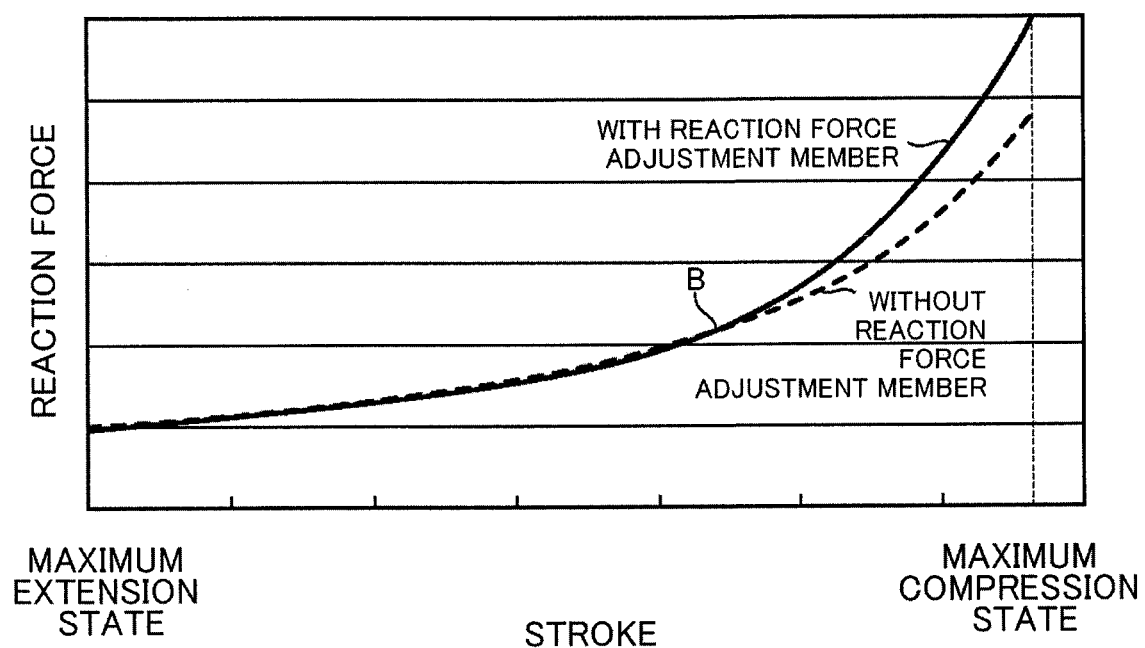
FIG. 10 is a diagram illustrating reaction force characteristics when the cylindrical member illustrated in FIG. 7 is provided.
Figure 11:
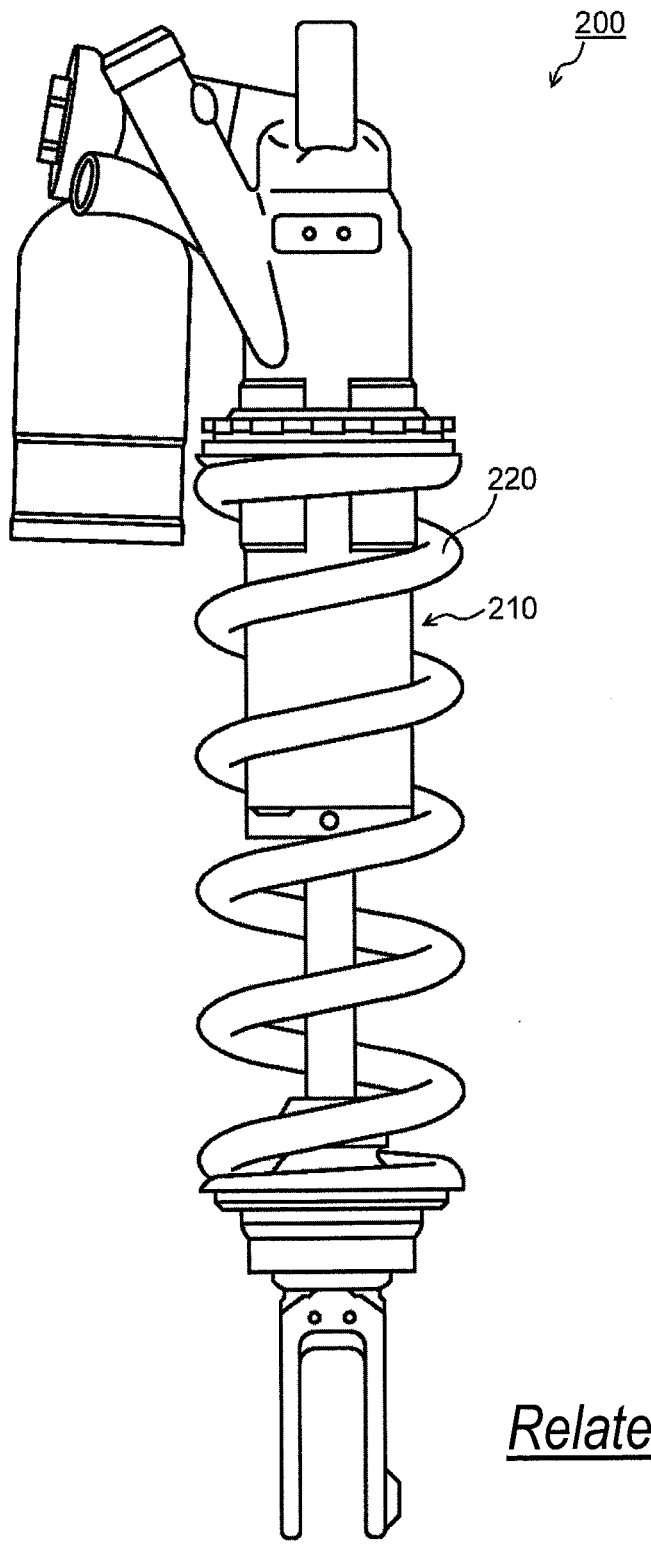
FIG. 11 is a side view illustrating an appearance of a related-art suspension provided on a rear wheel of a motorcycle.
Figure 12:
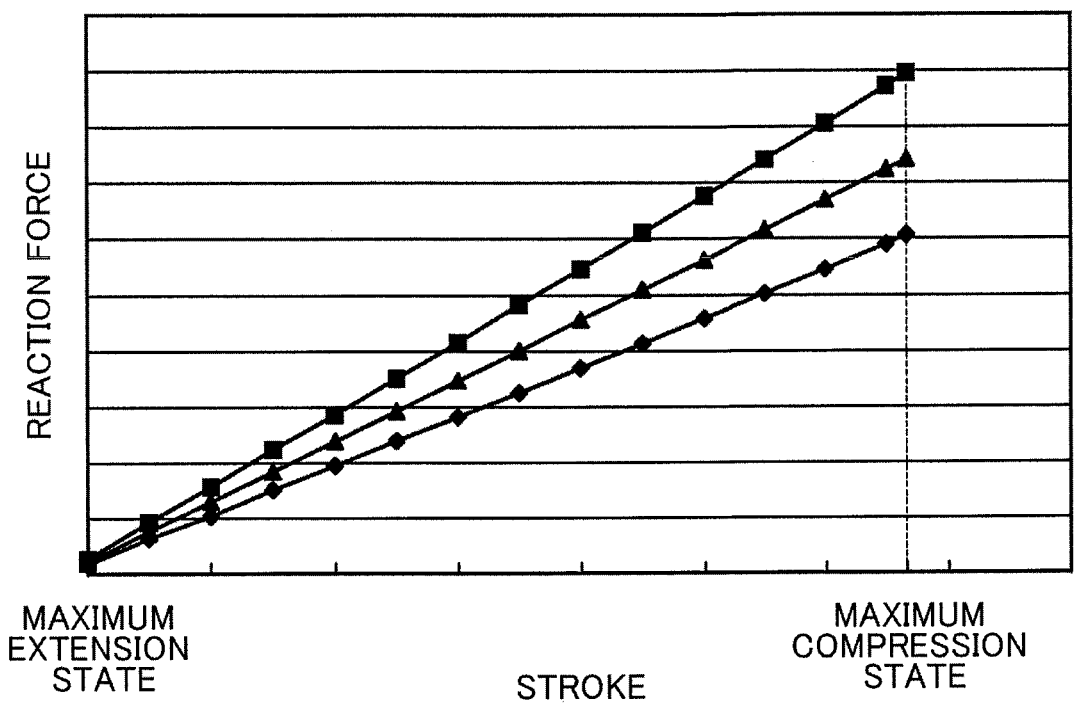
FIG. 12 is a diagram illustrating reaction force characteristics of a metal coil spring of the related-at suspension.
Figure 13:
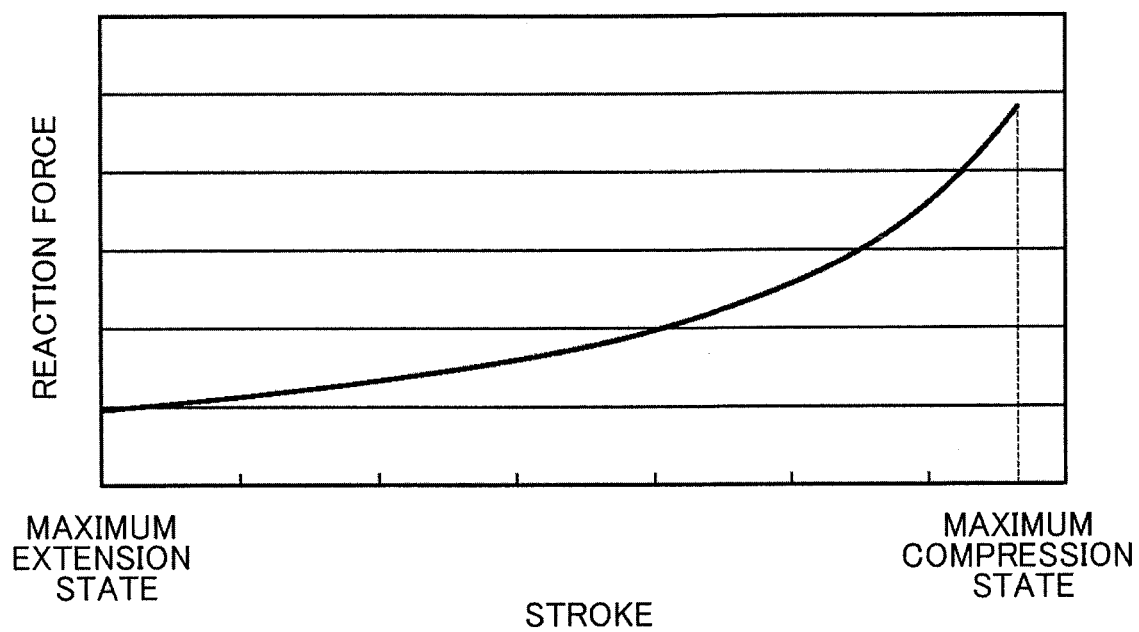
FIG. 13 is a diagram illustrating an example of reaction force characteristics of the related-art suspension having an air spring structure.

The reaction force characteristics were evaluated using two cylindrical members 70 of which the outer circumference surfaces have different uneven surface shapes illustrated in FIGS. 3 and 7. FIG. 8 is a diagram illustrating the reaction force characteristics when the reaction force adjustment member 60 is not provided and the air chamber 42 has different pressure conditions. FIG. 9 is a diagram illustrating the reaction force characteristics when the cylindrical member 70 illustrated in FIG. 3 is provided. FIG. 10 is a diagram illustrating the reaction force characteristics when the cylindrical member 70 illustrated in FIG. 7 is provided.

In FIGS. 9 and 10, the reaction force characteristics when the cylindrical member 70 is not provided is also depicted by broken line for comparison. Moreover, the results of the reaction force characteristics in FIGS. 8 to 10 are obtained by numerical analysis.

First, the reaction force characteristics when the reaction force adjustment member 60 is not provided and the air chamber 42 has different pressure conditions will be described with reference to FIG. 8.

Here, the pressure of the air chamber 42 was set to the two conditions of P1 and P2 depicted by broken and solid lines, respectively. P1 is set to initial setting pressure higher than P2. As illustrated in FIG. 8, at the pressure of P1 and P2, the reaction force increases monotonously with an increase in stroke.

Next, the reaction force characteristics when the reaction force adjustment member 60 is provided will be described with reference to FIGS. 9 and 10.

In the evaluation illustrated in FIGS. 9 and 10, the initial setting pressure of the air chamber 42 is set to P1, as illustrated in FIG. 8. As illustrated in FIGS. 9 and 10, the reaction force characteristics when the reaction force adjustment member 60 is provided are depicted by solid line and the reaction force characteristics when the reaction force adjustment member 60 is not provided are depicted by broken line. That is, it can be understood that the reaction force characteristics caused by the pressure of the air chamber 42 when the reaction force adjustment member 60 is provided are different from those when the reaction force adjustment member 60 is not provided.

For example, in FIG. 9, at stroke values of point A or smaller, the reaction force when the reaction force adjustment member 60 is provided is larger than the reaction force when the reaction force adjustment member 60 is not provided. Moreover, a rate of increase in the reaction force with respect to the stroke with the reaction force adjustment member 60 and the rate without it are different. On the other hand, when the stroke exceeds the point A, the reaction force when the reaction force adjustment member 60 is provided is smaller than the reaction force when the reaction force adjustment member 60 is not provided.

For example, in FIG. 10, at stroke values of point B or smaller, the reaction force with the reaction force adjustment member 60 and the reaction force without it are approximately the same. On the other hand, when the stroke exceeds the point B, the reaction force when the reaction force adjustment member 60 is provided is larger than the reaction force when the reaction force adjustment member 60 is not provided.

It can be understood that the reaction force characteristics when the reaction force adjustment member 60 is provided, illustrated in FIGS. 9 and 10 are considerably different. That is, it can be understood that the reaction force characteristics can be adjusted arbitrarily according to the uneven surface shape of the outer circumference surface of the cylindrical member 70.

Further, as illustrated in FIG. 8, since the reaction force characteristics can be adjusted according to the pressure of the air chamber 42, it can be understood that the reaction force characteristics can be adjusted arbitrarily according to a combination of the pressure of the air chamber 42 and the uneven surface shape of the outer circumference surface of the cylindrical member 70.

Although the reaction force characteristics when the stroke was changed from the maximum extension state to the maximum compression state has been illustrated, it was confirmed that the reaction force characteristics when the stroke was changed from the maximum compression state to the maximum extension state showed the same tendency.

Here, the reaction force adjustment members 60 and 61 and the suspensions 10 and 11 having the reaction force adjustment members 60 and 61 according to the present embodiments can be applied to a rear suspension (rear cushion) of a motorcycle, for example. Moreover, in the above embodiments, although examples in which the damping force generating device and the reservoir are provided outside the damper body as a suspension have been illustrated, the configuration of the present embodiments can be applied to a suspension in which the damping force generating device and/or the reservoir are provided inside the damper body.

While certain embodiments of the present invention have been described, these embodiments have been presented by way of example only, and are not intended to limit the scope of the inventions. These novel embodiments may be embodied in a variety of other forms, and various omissions, substitutions, and changes may be made without departing from the spirit of the present invention. These embodiments and the modifications thereof fall within the scope and spirit of the present invention and fall within the inventions described in the claims and the range of equivalents thereof.

As discussed above, the description of embodiments also describes the following matters.

[1] It is a reaction force adjustment member attached to a suspension, the suspension comprising: a cylinder; a piston rod which has a piston at one end thereof and which is inserted into the cylinder together with the piston; and a diaphragm which has one end fixed to the cylinder and the other end fixed to the other end of the piston rod and which forms an air chamber around at least the piston rod, the reaction force adjustment member comprising: a cylindrical member which is provided on an outer circumference of the cylinder surrounded by the diaphragm when the suspension is extended and compressed, wherein an outer circumference surface of the cylindrical member has an uneven surface.

[2] In the reaction force adjustment member according to [1], the uneven surface of the outer circumference surface of the cylindrical member is formed of a curved surface.

[3] In the reaction force adjustment member according to [1] or [2], the uneven surface of the outer circumference surface of the cylindrical member changes in an axial direction.

[4] In the reaction force adjustment member according to any one of [1] to [3], the cylindrical member is divided into a plurality of members in a circumferential direction of the cylindrical member and is detachably provided on the outer circumference of the cylinder.

[5] The reaction force adjustment member according to [1], further comprises: a fixing member which fixes the cylindrical member to the outer circumference of the cylinder.

[6] In the reaction force adjustment member according to [5], the uneven surface of the outer circumference surface of the cylindrical member is formed of a curved surface.

[7] In the reaction force adjustment member according to [5] or [6], the uneven surface of the outer circumference surface of the cylindrical member changes in an axial direction.

[8] In the reaction force adjustment member according to any one of [5] to [7], the cylindrical member is divided into a plurality of members in a circumferential direction of the cylindrical member and is detachably provided on the outer circumference of the cylinder.

[9] In the reaction force adjustment member according to [8], the fixing member is detachably provided on the outer circumference of the cylinder.

[10] In the reaction force adjustment member according to [8] or [9], the fixing member is formed of an annular member, and the fixing member is divided into a plurality of members in a circumferential direction of the fixing member and is detachably provided on the outer circumference of the cylinder.

[11] In the reaction force adjustment member according to [8] or [9], the fixing member is formed of an annular member, and the fixing member includes an inner circumferential portion having a threaded portion that engages with a threaded portion formed on the outer circumference surface of the cylinder to extend in the axial direction.

[12] In the reaction force adjustment member according to [10], the fixing member includes an inner circumferential portion having a threaded portion that engages with a threaded portion formed on the outer circumference surface of the cylinder to extend in the axial direction.

What is claimed is:

1. A suspension comprising:
   a cylinder;
   a piston rod which has a piston at one end thereof and which is inserted into the cylinder together with the piston;
   a diaphragm which has one end fixed adjacent to the cylinder and the other end fixed adjacent to the other end of the piston rod and which forms an air chamber around at least the piston rod; and
   a cylindrical member which is provided on an outer circumference of the cylinder surrounded by the diaphragm when the suspension is extended and compressed,
   wherein an outer circumference surface of the cylindrical member has an uneven surface, and
   the one end of the diaphragm is fixed at a position away from an end of the cylindrical member in an axial direction of the piston rod.

2. The suspension according to claim 1, further comprising:
   a fixing member which fixes the cylindrical member to the outer circumference of the cylinder.

3. The suspension according to claim 2, wherein the cylindrical member is divided into a plurality of members in a circumferential direction of the cylindrical member and is detachably provided on the outer circumference of the cylinder.

4. The suspension according to claim 3, wherein the fixing member is formed of an annular member, and
   the fixing member is divided into a plurality of members in a circumferential direction of the fixing member and is detachably provided on the outer circumference of the cylinder.

5. The suspension according to claim 4, wherein the cylinder has a threaded portion formed on the outer circumference surface thereof, and
   the fixing member includes an inner circumferential portion having a threaded portion that engages with the threaded portion formed on the outer circumference surface of the cylinder to extend in the axial direction.

6. The suspension according to claim 3, wherein the fixing member fixes the cylindrical member to the outer circumference of the cylinder in a detachable manner.

7. The suspension according to claim 3, wherein the cylinder has a threaded portion formed on the outer circumference surface thereof,
   the fixing member is formed of an annular member, and
   the fixing member includes an inner circumferential portion having a threaded portion that engages with the threaded portion formed on the outer circumference surface of the cylinder to extend in the axial direction.

8. The suspension according to claim 2, wherein the uneven surface of the outer circumference surface of the cylindrical member is formed of a curved surface.

9. The suspension according to claim 2, wherein the uneven surface of the outer circumference surface of the cylindrical member changes in an axial direction.

10. The suspension according to claim 1, further comprising an end member having an open end and a bottom at the other end, said end member being provided on an outer surface of the cylinder.

11. The suspension according to claim 10, wherein the one end of the diaphragm is directly fixed to the end member.

12. The suspension according to claim 10, wherein the end member is air-tightly fixed to the cylinder.

13. The suspension according to claim 1, wherein the uneven surface of the outer circumference surface of the cylindrical member is formed of a curved surface.

14. The suspension according to claim 1, wherein the uneven surface of the outer circumference surface of the cylindrical member changes in an axial direction.

15. The suspension according to claim 1, wherein the cylindrical member is divided into a plurality of members in a circumferential direction of the cylindrical member and is detachably provided on the outer circumference of the cylinder.

16. The suspension according to claim 1, further comprising:
    a cylindrical cover which has one end fixed to the other end of the piston rod and the other end being open and which covers the outer circumference of the diaphragm.

* * * * *